(12) United States Patent
Nishikawa et al.

(10) Patent No.: US 9,139,176 B2
(45) Date of Patent: Sep. 22, 2015

(54) BRAKE DEVICE FOR A MOTORCYCLE

(75) Inventors: Yutaka Nishikawa, Wako (JP); Kazuya Takenouchi, Wako (JP); Takehiko Nanri, Wako (JP); Kazuhiko Tani, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 1110 days.

(21) Appl. No.: 12/721,663

(22) Filed: Mar. 11, 2010

(65) Prior Publication Data
US 2010/0244548 A1 Sep. 30, 2010

(30) Foreign Application Priority Data

Mar. 30, 2009 (JP) ................................. 2009-081333

(51) Int. Cl.
| | |
|---|---|
| *B60T 8/26* | (2006.01) |
| *B60T 8/32* | (2006.01) |
| *B60T 8/40* | (2006.01) |
| *B60T 13/66* | (2006.01) |

(52) U.S. Cl.
CPC ............. *B60T 8/261* (2013.01); *B60T 8/3225* (2013.01); *B60T 8/4081* (2013.01); *B60T 13/662* (2013.01)

(58) Field of Classification Search
CPC ..... B60T 8/261; B60T 8/3225; B60T 8/4081; B60T 13/662
USPC .......................... 303/9.64, 139, 167, 155–159; 188/24.11, 24.16, 24.18
See application file for complete search history.

(56) References Cited

U.S. PATENT DOCUMENTS

| | | | | |
|---|---|---|---|---|
| 5,620,237 | A * | 4/1997 | Iwashita et al. | 303/9.64 |
| 6,409,285 | B1 * | 6/2002 | Wakabayashi et al. | 303/9.64 |
| 7,188,911 | B2 * | 3/2007 | Tani et al. | 303/9.64 |
| 7,347,508 | B2 * | 3/2008 | Nakayama et al. | 303/9.64 |
| 7,549,710 | B2 * | 6/2009 | Takenouchi et al. | 303/9.64 |
| 2006/0131954 | A1 * | 6/2006 | Ogawa et al. | 303/122.09 |
| 2006/0138858 | A1 * | 6/2006 | Nakayama et al. | 303/9.64 |

FOREIGN PATENT DOCUMENTS

| | | |
|---|---|---|
| JP | 11-005580 | 1/1999 |
| JP | 2005-239134 | 9/2005 |
| JP | 2006-176086 | 7/2006 |

OTHER PUBLICATIONS

Unofficial machine translation of JP 2005-239134.*

* cited by examiner

*Primary Examiner* — Robert A Siconolfi
*Assistant Examiner* — Mahbubur Rashid
(74) *Attorney, Agent, or Firm* — Squire Patton Boggs (US) LLP

(57) ABSTRACT

A brake device 10 for a motorcycle is capable of electrically performing driving so as to control a front wheel brake caliper 16 and a rear wheel brake caliper 18 in response to each operation of a brake lever 12 and a brake pedal 14 and is configured so that the rear wheel brake caliper 18 and the front wheel brake caliper 16 can be combined based on the operation of the brake pedal 14. The brake device 10 performs correction of a target hydraulic pressure acting on the front wheel brake caliper 16 using a prescribed preset function in such a manner as to give a braking force smaller than a braking force corresponding to an additional operation of the brake lever 12 when the brake lever 12 is additionally operated in the state where the brake pedal 14 is operated and the front wheel brake caliper 16 is generating braking force in combination with the rear wheel brake caliper 18.

19 Claims, 3 Drawing Sheets

REAR WHEEL BRAKE
INPUT PRESSURE

FRONT WHEEL BRAKE
INPUT PRESSURE

FRONT WHEEL BRAKE
CALIPER PRESSURE

NO ADDITIONAL BRAKE INPUT CONTROL
ADDITIONAL BRAKE INPUT CONTROL

NO ADDITIONAL
BRAKE OPERATION t0   t1   t2

TIME

FRONT WHEEL BRAKE CALIPER PRESSURE

BRAKE DEVICE FOR A MOTORCYCLE

BACKGROUND

1. Field:

Embodiments of the present invention relate to a brake device for a motorcycle. The brake device enables, for example, a rear wheel braking unit and a front wheel braking unit to operate in combination based on operation of the rear wheel braking operation unit so as to enable drive control.

2. Description of the Related Art:

A combined brake system (CBS) in a motorcycle brake device is a system where hydraulic pressure actuates a braking unit when the brake operation unit (brake lever or brake pedal) of a front wheel or a rear wheel is operated. A prescribed amount of hydraulic pressure also actuates the braking unit for the wheel on the side that is not operated.

For example, devices that control braking force distribution across a front wheel braking unit and a rear wheel braking unit are disclosed in Japanese Patent Publication Laid-open No. Hei. 11-5580, Japanese Patent Publication Laid-open No. 2005-239134, and Japanese Patent Publication Laid-open No. 2006-176086.

as motorcycle braking devices to which combined brake systems are applied.

However, with brake devices to which a combined brake system is applied such as, for example, when a brake lever that is a front wheel braking operation unit is operated in addition to a brake pedal that is a rear wheel braking operation unit so that the rear wheel and front wheel braking units are combined so as to generate a prescribed braking force, hydraulic pressure due to the additional operation is added to the front wheel braking unit that is already generating braking force.

This means that a braking force that is larger than is assumed by the driver, based on the travelling and other conditions, is generated. As a result, there is the possibility of front wheel side brake control (braking behavior) causing discomfort. In particular, there is the possibility of substantial discomfort being experienced by a driver driving a motorcycle that is not mounted with a CBS.

SUMMARY

Therefore, embodiments of the present invention provide a motorcycle brake device capable of providing a braking operation feeling that does not cause discomfort and to improve control even for motorcycles mounted with a combined braking system.

A brake device for a motorcycle, according to one embodiment of the present invention, is capable of electrically driving and controlling a front wheel braking unit and a rear wheel braking unit in response to each operation of a front wheel braking operation unit and a rear wheel braking operation unit. The brake device is also capable of driving and controlling the rear wheel braking unit and the front wheel braking unit in a combined manner based on an operation of the rear wheel braking operation unit. A target hydraulic pressure acting on the front wheel braking unit is corrected using a preset prescribed function. The target hydraulic pressure is corrected in such a manner that the braking force becomes smaller than a braking force corresponding to an additional operation of the front wheel braking operation unit, when the front wheel braking operation unit is operated in addition to the rear wheel braking operation unit and the front wheel braking unit is generating braking force in combination with the rear wheel braking unit.

In one embodiment, the correction is carried out so as to give a rise in hydraulic pressure in line with a tendency of the brake hydraulic pressure of the front wheel braking unit generated in combination with the operation of the rear wheel braking operation unit to rise.

In another embodiment, the target hydraulic pressure acting on the front wheel braking unit is decided by adding the hydraulic pressure of the front wheel braking unit acting in combination with the rear wheel braking unit based on the operation of the rear wheel braking operation unit and the target additional hydraulic pressure for after the target additional hydraulic pressure intended to act on the front wheel braking unit based on the additional operation is corrected using the prescribed function.

In another embodiment, the target additional hydraulic pressure is corrected using a correction coefficient set in advance by a relationship with a magnitude of hydraulic pressure for the front wheel braking unit.

In another embodiment, the prescribed function is a function that corrects the target additional hydraulic pressure using a prescribed rate of decreasing.

In yet another embodiment, the correction coefficient is a map set in advance correlated to the magnitude of the hydraulic pressure of the front wheel braking unit.

Embodiments of the invention may also include a method of braking. The method includes electrically driving and controlling a front wheel braking unit and a rear wheel braking unit in response to each operation of a front wheel braking operation unit and a rear wheel braking operation unit, and driving and controlling the rear wheel braking unit and the front wheel braking unit in a combined manner based on an operation of the rear wheel braking operation unit. The method further includes correcting a target hydraulic pressure acting on the front wheel braking unit using a preset prescribed function in such a manner that a braking force becomes smaller than a braking force corresponding to an additional operation of the front wheel braking operation unit, when the front wheel braking operation unit is operated in addition to the rear wheel braking operation unit, and the front wheel braking unit is generating braking force in combination with the rear wheel braking unit.

Other embodiments of the invention include a brake device. The brake device may include a driving unit configured to electrically drive and control a front wheel braking unit and a rear wheel braking unit in response to each operation of a front wheel braking operation unit and a rear wheel braking operation unit, and configured to drive and control the rear wheel braking unit and the front wheel braking unit in a combined manner based on an operation of the rear wheel braking operation unit. The brake device may further include a correcting unit configured to correct a target hydraulic pressure acting on the front wheel braking unit using a preset prescribed function in such a manner that a braking force becomes smaller than a braking force corresponding to an additional operation of the front wheel braking operation unit, when the front wheel braking operation unit is operated in addition to the rear wheel braking operation unit, and the front wheel braking unit is generating braking force in combination with the rear wheel braking unit.

According to one embodiment, a target hydraulic pressure acting on the front wheel braking unit is corrected using a preset prescribed function. This correction is performed in such a manner that the braking force becomes smaller than a braking force corresponding to an additional operation of the front wheel braking operation unit when the front wheel braking operation unit is generating braking force as a result of combined braking configured so that the rear wheel braking unit and the front wheel braking unit are combined based on the operation of the rear wheel braking operation unit so as to be capable of being controllably driven. As a result, it is possible to effectively prevent hydraulic pressure based on the additional operation from simply being added to hydraulic pressure acting as a result of existing combined braking. Similarly, it is possible to prevent the braking force at the front wheel braking unit from becoming abruptly high, and discomfort felt by the rider is avoided. It is also therefore possible to improve breaking operation feeling and control.

According to another embodiment, the correction is carried out so as to give a rise in hydraulic pressure in line with a tendency of the brake hydraulic pressure of the front wheel braking unit generated in combination with the operation of the rear wheel braking operation unit to rise. As a result, it is possible to suppress a feeling of discomfort between the break operation and the braking force to as great an extent is possible, and the feeling of the break operation and control are therefore both improved dramatically.

According to another embodiment, when the target hydraulic pressure at the front wheel braking unit is decided by adding the corrected target additional hydraulic pressure to the hydraulic pressure at the front wheel braking unit acting as a result of the combined braking, the target hydraulic pressure provided to the front wheel braking unit can be appropriately corrected and the brake operation feeling and control can be improved.

According to another embodiment, when the target additional hydraulic pressure is corrected using a correction coefficient set in advance using a relationship with a magnitude of hydraulic pressure of the front wheel braking unit, it is possible to appropriately add hydraulic pressure to the hydraulic pressure currently acting at the front wheel braking unit even when there is an additional operation of the front wheel braking operation unit.

According to another embodiment, when the prescribed function is a function that corrects the target additional hydraulic pressure using a prescribed rate of decreasing, the occurrence of an abrupt rise in the braking force at the front wheel braking unit as the result of an additional operation of the front wheel brake operation unit can be reliably avoided.

According to another embodiment, when the correction coefficient is a map set in advance correlated to the magnitude of the hydraulic pressure of the front wheel braking unit, it is possible to implement an operation relating to correction of the target additional hydraulic pressure in a much more straightforward manner. It is therefore possible to easily provide compatibility with different models and changes to specifications by only changing the map. This reduces both a number of steps and the cost.

DETAILED DESCRIPTION

The following is a detailed description of a brake device for a motorcycle, according to one embodiment, referring to the appended drawings.

Figure 1:
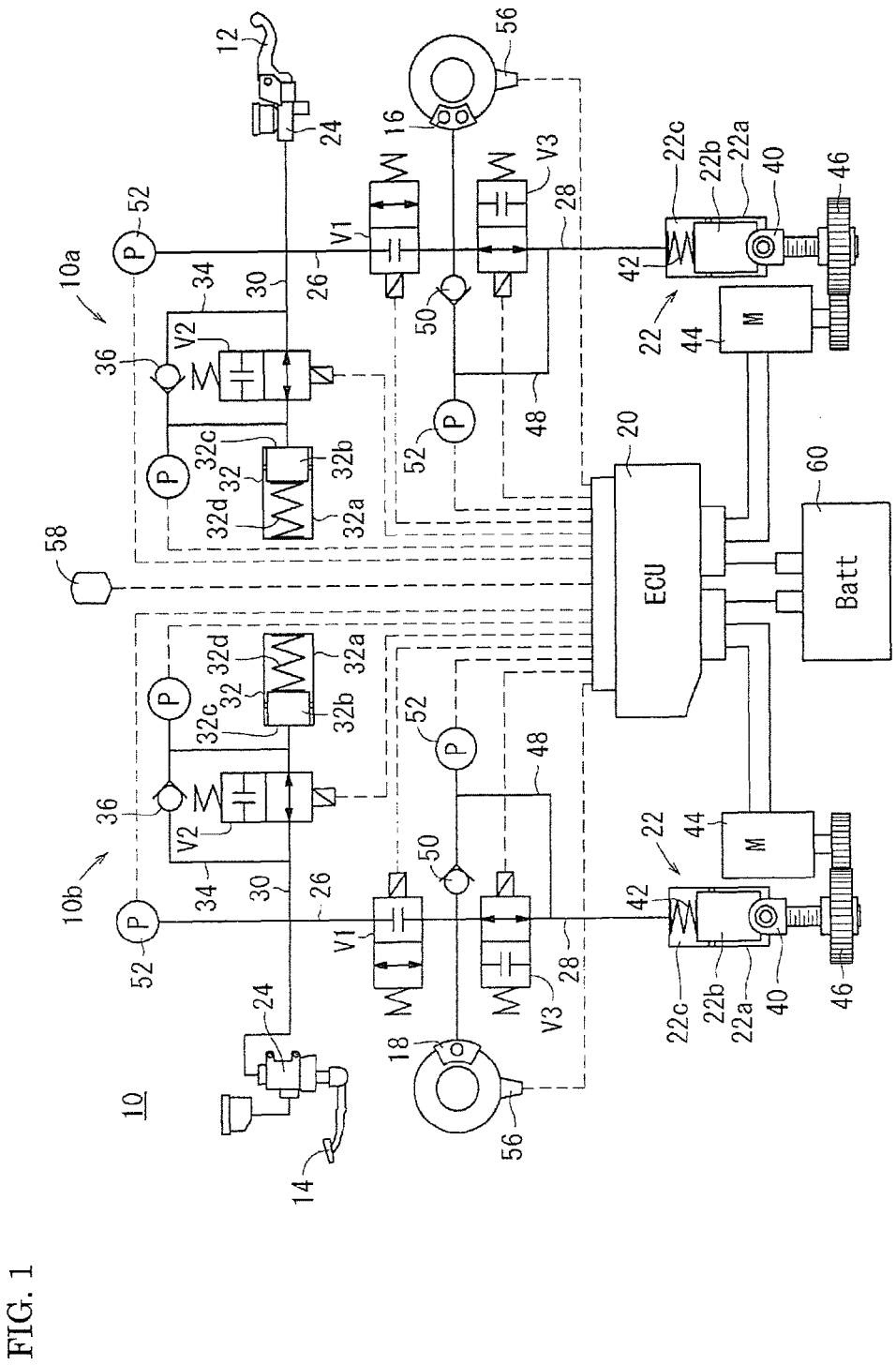
FIG. 1 is a circuit diagram showing a configuration for a brake device for a motorcycle according to an embodiment of the present invention.

FIG. 1 is a circuit diagram showing a configuration for a brake device 10 for a motorcycle according to one embodiment of the present invention. The brake device 10 (can be mounted on various motorcycles. A front wheel brake caliper 16 and a rear wheel brake caliper 18 are driven and controlled by the operation of a brake lever 12 and a brake pedal 14 by the driver (rider) so as to provide a prescribed braking force for the vehicle.

As shown in the example of FIG. 1, the brake device 10 can be an independently provided front wheel brake circuit 10a and rear wheel brake circuit 10b linked by an ECU (controller, control unit) 20.

At the brake device 10, a braking operation is carried out using the brake lever 12 that is a front wheel brake operation unit at the front wheel brake circuit 10a and is carried out using the brake pedal 14 that is a rear wheel braking operation unit at the rear wheel brake circuit 10b. Other aspects of the configuration are substantially the same for both the front wheel brake circuit 10a and the rear wheel brake circuit 10b. A description is given in the following of the front wheel brake circuit 10a. However, the same reference numerals are given to configuration elements of the rear wheel brake circuit 10b that are the same as or similar to those of the front wheel brake circuit 10a and duplicate descriptions are not given.

In one embodiment, the brake device 10 adopts a by-wire method (braking by-wire) at the front wheel brake circuit 10a and the rear wheel brake circuit 10b. Namely, the extent of operation (in this embodiment, the hydraulic pressure) of the brake lever 12 and the brake pedal 14 that are brake operation units is electrically detected at the brake device 10. Prescribed braking forces are then generated at the front wheel brake caliper 16 and the rear wheel brake caliper 18 that are the braking units as a result of hydraulic pressure created by the hydraulic pressure modulator 22 based on the detected values.

Moreover, at the brake device 10, a combined brake system (CBS) is adopted. The CBS is capable of exerting control so that when one of the front wheel side and the rear wheel braking operation units, for example, the brake pedal 14 that is the rear wheel braking operation unit is operated, the front wheel brake caliper 16 and the rear wheel brake caliper 18 constituting the front wheel side and the rear wheel braking units are combined under the control of the ECU 20. Specifically, when, for example, the brake pedal 14 is operated, at the rear wheel brake circuit 10b, the hydraulic pressure modulator 22 is drive controlled using a by-wire method under the control of the ECU 20 based on the hydraulic pressure of a master cylinder 24 so that a prescribed hydraulic pressure acts on the rear wheel brake caliper 18. Further, the hydraulic pressure modulator 22 of the front wheel brake circuit 10a is also combined so as to be drive controlled, so that a prescribed hydraulic pressure also acts on the front wheel brake caliper 16.

As shown in FIG. 1, the master cylinder 24 coupled to the brake lever 12 (brake pedal 14) that is a brake operation unit and the front wheel brake caliper 16 (rear wheel brake caliper 18) corresponding to the master cylinder 24 are connected by a main path 26 at the front wheel brake circuit 10a (rear wheel brake circuit 10b). The hydraulic pressure modulator 22 merges with a supply/discharge path 28 midway along the main path 26.

A normally open first electromagnetic switching valve V1 that opens and blocks between the master cylinder 24 and the front wheel brake caliper 16 is installed at the main path 26. The valve V1 may be installed further to the side of the master cylinder 24 than a section connecting with the supply/discharge path 28.

Further, in one embodiment, a branch path 30 is connected to the main path 26 and a fluid loss simulator 32 is connected to the branch path 30 via a usually closed second electromagnetic switching valve V2. The fluid loss simulator 32 has a function for causing pseudo fluid pressure reactive force to act on the master cylinder 24 in response to the extent of operation of the brake lever 12 while the first electromagnetic switching valve V1 closes the main path 26 (during the by-wire action shown in FIG. 1). The second electromagnetic switching valve V2 then opens the branch path 30 while reactive force is provided by the fluid loss simulator 32 and causes the master cylinder 24 side and the fluid loss simulator 32 to communicate.

According to certain embodiments, the fluid loss simulator 32 houses a piston 32b in a cylinder 32a in a freely retractable manner. A fluid chamber 32c that receives hydraulic fluid (brake fluid) that flows in from the side of the master cylinder 24 is formed between the cylinder 32a and the end surface of the piston 32b. A reactive spring 32d where, for example, a coil spring and a resin spring of different characteristics are in series is provided at the rear section side (back pressure side) of the piston 32b. The reactive spring 32d provides reactive force to the piston 32b, such that the starting up with respect to the operation of the brake lever 12 that is the brake operation unit is smooth and starting up at the stroke end is abrupt.

In some embodiments, a bypass path 34 that bypasses the second electromagnetic switching valve V2 is further provided at the branch path 30. A check valve 36 that permits the flow of hydraulic fluid from the side of the fluid loss simulator 32 in the direction of the master cylinder 24 is provided at the bypass path 34.

The hydraulic pressure modulator 22 can be equipped with a cam mechanism 40 that pushes a piston 22b provided within a cylinder 22a in the direction of an hydraulic chamber 22c formed between the cylinder 22a and the end surface of the piston 22b, a return spring 42 that normally urges the piston 22b to the side of the cam mechanism 40, and an electric motor 44 for actuating the cam mechanism 40. The hydraulic chamber 22c is connected so as to communicate with the supply/discharge path 28. The hydraulic pressure modulator 22 pushes the piston 22b taking the initial position of the cylinder 22a as a reference or can return the piston 22b using the return spring 42 by driving the cam mechanism 40 via a gear mechanism 46 using the electric motor 44. Namely, in an embodiment, the hydraulic pressure modulator 22 increases or reduces the pressure (hydraulic pressure) of the hydraulic chamber 22c and it is possible to increase or reduce the braking pressure of the front wheel brake caliper 16 that is the braking unit.

An electric motor 23 can accurately and easily adjust the position of the piston 22b decided by a position of rotation of the cam mechanism 40 by adjusting a current value decided by the input duty ratio (on time/on time+off time) using, for example, PWM control and can adjust the pressure of the hydraulic chamber 22c.

According to one embodiment, a normally closed third electromagnetic switching valve V3 and a bypass path 48 that bypasses the third electromagnetic switching valve V3 are provided at the supply/discharge path 28. A check valve 50 that permits the flow of hydraulic fluid from the hydraulic pressure modulator 22 towards the front wheel brake caliper 16 that is a braking unit can be provided at the bypass path 48.

In some embodiments, input side pressure sensors (P) 52 that are on the side of the master cylinder 24 and sandwich the first electromagnetic switching valve V1 and output side pressure sensors (P) 54 that are on the side of the front wheel brake caliper 16 are provided at the front wheel brake circuit 10a. An angular sensor (not shown) for feedback of angular information is provided at a cam shaft (not shown) of the cam mechanism 40 and a vehicle speed sensor 56 that detects the speed of the vehicle is provided in the vicinity of the front wheel brake caliper 16.

A mode switching switch 58 that can switch the control mode as a result of manual operation by the rider can be provided at the brake device 10. The driver then performs selection by switching this over when CBS control is desired. The following is a description of when CBS control is selected.

According to some embodiments, the ECU 20 then receives power supplied from a battery 60 so as to exert control to open and close the first electromagnetic switching valve V1, the second electromagnetic switching valve V2, and the third electromagnetic switching valve V3 based on detection signals of the pressure sensors 52 and 54 and detection signals of the vehicle speed sensor 56 and the angular sensor so as to drivably control the electric motor 44 (in FIG. 1 the signal line is shown using a broken line).

Specifically, when one brake operation unit, for example, the brake pedal 14 is operated, the speeds of the front and rear wheels at this time are inputted to the ECU 20 from the vehicle speed sensor 56 together with information such as the extent of operation of the brakes inputted to the ECU 20 via the pressure sensors 52. The first electromagnetic switching valves V1 for the brake circuits 10a and 10b for the front and rear wheels maintain the main path 26 in the closed direction as shown in FIG. 1 as a result of an instruction from the ECU 20. At the same time, the opening direction of the second and third electromagnetic switching valves V2 and V3 are maintained in the open direction so that each hydraulic pressure modulator 22 supplies hydraulic pressure to the front wheel brake caliper 16 and the rear wheel brake caliper 18 according to vehicle running conditions and the brake operations.

In the event that the brake lever 12 that is a further brake operation unit is additionally operated in a state where the front and rear wheels are interlocked and a braking force is generated based on an operation of the brake pedal 14, when the hydraulic pressure modulator 22 for the front wheel exerts drive control so as to simply add hydraulic pressure for the additional operation, a braking force larger than that assumed by the rider is generated at the front wheel brake caliper 16. Therefore, there is a possibility that the front wheel side brake control (braking behavior) will be the cause of discomfort. In other words, the rider first operates the brake pedal 14 in order to reduce speed. When the brake lever 12 is then additionally operated so as to cause the front wheel side brake to brake so as to correct for deficiencies in the rear wheel side braking, there is the possibility of the discomfort mentioned previously occurring, with this tendency being particularly marked for riders that ride motorcycles that are not fitted with a CBS.

When the other brake operation unit is additionally operated in a state where the front and rear wheels are combined by the CBS so as to generate braking force at the brake device 10 of this embodiment, control (referred to in the following as "additional brake input control") is executed in such a manner that target hydraulic pressure acting on the braking units is taken to be the target hydraulic pressure taking into consideration the magnitude of braking force generated by the combined brakes rather than by simply adding the additional operation portion. Discomfort experienced by the rider is therefore suppressed by as great an extent as possible.

Next, a description is given of this control method and the results of this operation for the brake device 10 for a motorcycle according to one embodiment.

Figure 2A:
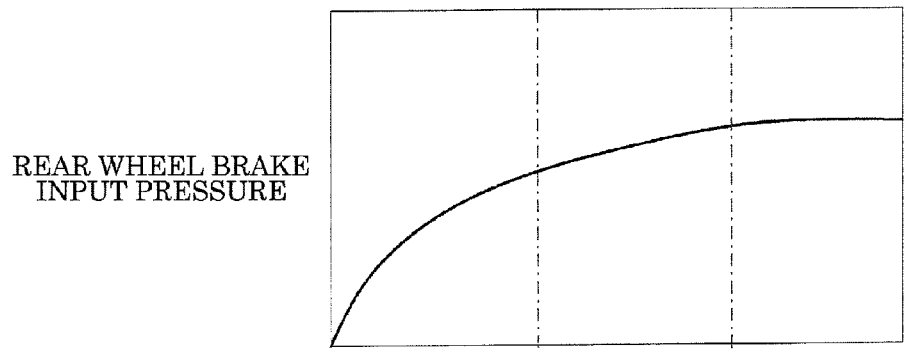
FIG. 2A shows a change over time of an extent of operation of a brake pedal that is a rear wheel braking operation unit.
Figure 2B:
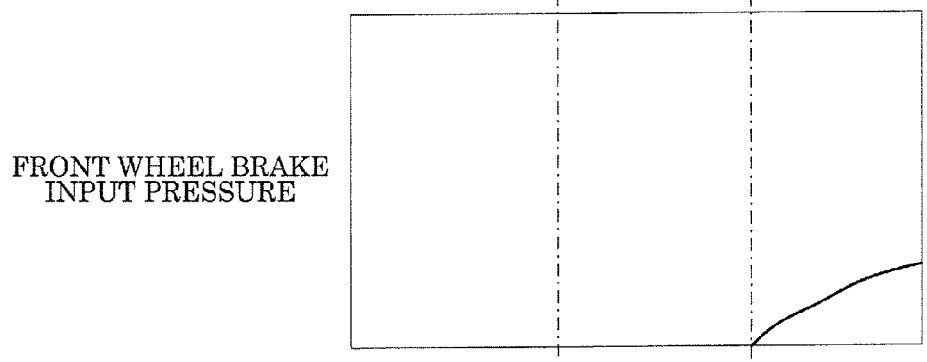
FIG. 2B shows a change over time of an extent of operation of a brake lever that is a front wheel braking operation unit.
Figure 2C:
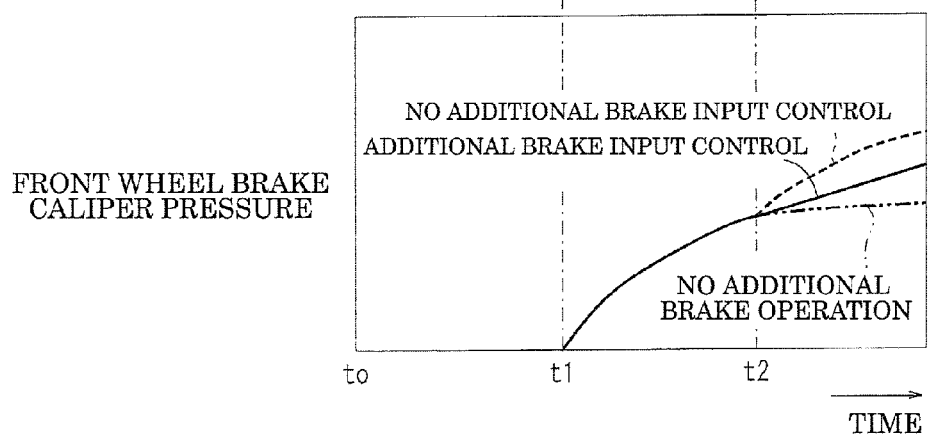
FIG. 2C shows change over time of hydraulic pressure of a front wheel brake caliper 16 provided by a hydraulic pressure modulator 22 on the front wheel side.
Figure 3:
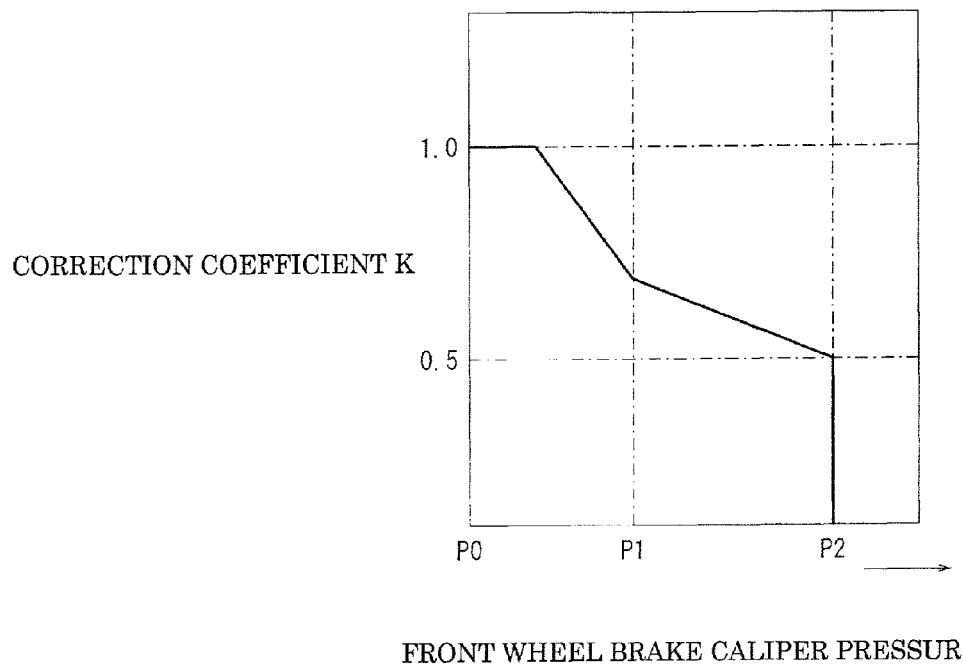
FIG. 3 is a map showing the relationship between a correction coefficient for correcting a target additional hydraulic pressure for additional braking input control and the front wheel brake caliper pressure.

FIGS. 2A to 2C are graphs showing braking operation states when additional braking input control is executed. FIG. 2A shows change over time of an extent of operation (rear wheel side brake input pressure) of the brake pedal 14 that is a rear wheel braking operation unit. FIG. 2B shows a change over time of an extent of operation (front wheel side brake input pressure) of the brake lever 12 that is the front wheel braking operation unit. FIG. 2C shows a change over time in hydraulic pressure (front wheel side brake caliper pressure) of the front wheel brake caliper 16 provided at the front wheel hydraulic pressure modulator 22. FIG. 3 is a map showing the relationship between a correction coefficient for correcting target additional hydraulic pressure occurring in additional braking input control and the front wheel brake caliper pressure.

First, according to one example, when the brake pedal 14 that is the rear wheel braking operation unit is operated by the rider in order to reduce speed by a prescribed amount while the vehicle is travelling, the first electromagnetic switching valve V1 is closed at the rear wheel brake circuit 10b and the second electromagnetic switching valve V2 and the third electromagnetic switching valve V3 are opened under the electronic control of the ECU 20, as shown in FIG. 1. This means that, at the same time as the main path 26 comes away from the master cylinder 24 as a result of the closing operation of the first electromagnetic switching valve V1, the branch path 30 and the main path 26 cause the master cylinder 24 and the fluid loss simulator 32 to communicate due to the second electromagnetic switching valve V2 being open. The supply/discharge path 28 and the main path 26 cause the hydraulic pressure modulator 22 and the rear wheel brake caliper 18 to communicate due to the opening of the third electromagnetic switching valve V3. This makes braking using a by-wire method possible. At the same time, the first electromagnetic switching valve V1 is closed even at the front wheel brake circuit 10a, the second electromagnetic switching valve V2 and the third electromagnetic switching valve V3 are opened, and braking using the by-wire method is possible as with the rear wheel side braking circuit 10b.

The rear wheel brake input pressure is therefore detected by the pressure sensors 52 of the rear wheel brake circuit 10b (time t0 of FIG. 2A). The rear wheel hydraulic pressure modulator 22 is then controlled so as to be driven so that a prescribed hydraulic pressure is provided to the rear wheel brake caliper 18 using the by-wire method. Namely, although not shown in the drawings, a hydraulic pressure (rear wheel side brake caliper pressure) of the rear wheel brake caliper 18 rises so as to follow rear wheel side brake input pressure acting due to the operation of the brake pedal 14.

Subsequently, as shown in FIG. 2C, when the rear wheel side brake input pressure exceeds a prescribed value as shown in FIG. 2A, the ECU 20 drivably controls the hydraulic pressure modulator 22 of the front wheel brake circuit 10a based on braking force distribution of the front and rear wheels set at the brake device 10 in advance. Also, a prescribed hydraulic pressure (front wheel side brake caliper pressure) is provided to the front wheel brake caliper 16 (time t1 of FIG. 2C).

In this state, the driver operates the brake lever 12 that is the front wheel braking operation unit (time t2 of FIG. 2B). In doing so, rather than simply adding the target additional hydraulic pressure PC1 based on the extent of additional operation of the brake lever 12 to the generated hydraulic pressure PB acting in advance due to the combined braking with the brake pedal 14 as the target hydraulic pressure PA intended to be generated by the hydraulic pressure modulator 22 of the front wheel brake circuit 10a, the ECU 20 corrects the target additional hydraulic pressure PC1 based on the correction coefficient K shown in FIG. 3 and adds the corrected target additional hydraulic pressure PC2.

In this event, as shown in the example of FIG. 3, the correction coefficient K is a function specified by the correlation relationship with the front wheel side caliper pressure. Basically, the coefficient is set so as to be smaller for a higher front wheel side brake caliper pressure. For example, the correction coefficient K when the front wheel brake caliper pressure is a low pressure P0 is 1.0. The correction coefficient K for the case of an intermediate pressure P1 is, for instance, 0.7, and the correction coefficient K for the case of a high pressure P2 is, for example, 0.5.

In one embodiment, the target hydraulic pressure PA for the front wheel brake caliper pressure at the brake device 10 can be calculated based on the arithmetic expression A=PB+K×PC1=PB+PC2. For example, when generated hydraulic pressure PB that is the front wheel side brake caliper pressure actuated in combination with the initial operation of the brake pedal 14 is the intermediate pressure P1, the correction coefficient K is 0.7 (refer to FIG. 3), and when the brake lever 12 is further operated in this state, the ECU 20 sets a value that is the target additional hydraulic pressure PC1 due to the further operation multiplied by 0.7 (correction coefficient K) as the target additional hydraulic pressure PC2.

Control is then executed to take the value that is the generated hydraulic pressure PB with the target added hydraulic pressure PC2 added as the target hydraulic pressure PA, drivably control the front wheel side hydraulic pressure modulator 22, and provide the target hydraulic pressure PA to the front wheel brake caliper 16. Even when the additional operation of the brake lever 12 continues thereafter, it is possible to continue to execute the additional brake input control by acquiring the correction coefficient K for the generated hydraulic pressure PB at this time (hydraulic pressure acting based on the calculated target hydraulic pressure PA) from a map of FIG. 3, for example, every prescribed unit time, correcting the target additional hydraulic pressure PC1 based on the additional operation, and obtaining the target additional hydraulic pressure PC2.

By carrying out this additional braking control, it is possible to effectively avoid the target additional hydraulic pressure PC1 due to the additional operation of the brake lever being simply added to the generated hydraulic pressure PB acting previously and the front wheel side brake caliper pressure becoming abruptly high as shown by the dashed line for time t2 onwards of FIG. 2C. Namely, it is possible to control rises in the front wheel side brake caliper pressure to be substantially fixed as shown by the solid line for the time t2 onwards of FIG. 2C and it is possible to prevent the rider from feeling discomfort when braking to as great an extent as possible. The dotted and dashed line shown from the time t2 of FIG. 2C onwards exemplifies the state when the additional operation is not performed by the brake lever 12.

As described above, as a result of the operation of the brake pedal 14, the brake device 10 of this embodiment corrects the target hydraulic pressure PA actuated by the front wheel brake caliper 16 using a preset prescribed function, i.e. a correction coefficient K stipulated by the relationship with the generated hydraulic pressure PB. This results in the provision of a smaller braking force from that of the braking force corresponding to the additional operation of the brake lever 12 when there is an additional operation of the brake lever 12 that is the front wheel braking operation unit in the state where braking force is being generated by the front wheel brake caliper 16 constituting the front wheel braking unit combined with the rear wheel brake caliper 18 based on the prescribed generated hydraulic pressure PB.

More specifically, the target hydraulic pressure PA for the front wheel side brake caliper pressure is calculated by correcting the target additional hydraulic pressure PC1 acting on the front wheel brake caliper 16 based on the additional operation using the correction coefficient K, and adding the target additional hydraulic pressure PC2 for after correction to the generated hydraulic pressure PB. During this time, the correction coefficient K is set so as to be smaller for a larger generated hydraulic pressure PB, i.e. the hydraulic pressure portion for the additional operation is corrected using a prescribed rate of decreasing. In other words, the correction can be carried out in such a manner as to give an increase in hydraulic pressure (refer to the solid line shown for time t2 of FIG. 2C onwards) in line with the tendency to increase of the brake hydraulic pressure of the front wheel brake caliper 16 generated in combination with the operation of the brake pedal 14 (refer to from time t1 to time t2 of FIG. 2C).

It is therefore possible to substantially keep the rate of rise in the hydraulic pressure provided to the front wheel brake caliper 16 substantially fixed (refer to the solid line for time T3 onwards of FIG. 2C). It is additionally possible to suppress discomfort between the brake operation and the actual braking force to as great an extent as possible, and it is possible to improve both the feeling of the brakes and the control.

Further, at the brake device 10, a map (refer to FIG. 3) of the correction coefficients K can be stored in the ECU 20 (or in separate storage etc.). It is further possible to mount additional braking input control at various motorcycles by just setting the control program. This is both simpler and more flexible and means that even if there are differences between types of products or changes to the specifications etc., compatibility can easily be achieved through optimization by just changing the correction coefficient map. This enables the number of setting processes to be reduced and also enables mounting costs to be reduced.

The present invention is by no means limited to the above embodiment and various configurations and processes can be incorporated without deviating from the spirit of the present invention.

For example, structures other than the brake lever 12 and the brake pedal 14 can be adopted as the front wheel braking operation unit and the rear wheel braking operation unit.

A correction coefficient K can also be something other than that shown in FIG. 3 such as, for example, a tabular format using the relationship with the front wheel side brake caliper pressure or a prescribed arithmetic expression.

DESCRIPTION OF THE REFERENCE NUMERALS

Brake device 10
Rear wheel brake circuit 10b
Brake pedal 14
Rear wheel brake caliper 18
Hydraulic pressure modulator 22
Front wheel brake circuit 10a
Brake caliper 12
Front wheel brake caliper 16
ECU 20
Master cylinder 24

We claim:

1. A brake device for a motorcycle, the brake device configured to electrically drive and control a front wheel braking unit and a rear wheel braking unit in response to each operation of a front wheel braking operation unit and a rear wheel braking operation unit, and configured to drive and control the rear wheel braking unit and the front wheel braking unit in a combined manner based on an operation of the rear wheel braking operation unit, wherein a target hydraulic pressure acting on the front wheel braking unit is corrected using an arithmetic expression in such a manner that a braking force of the front wheel braking unit becomes smaller than a braking force corresponding to an additional operation of the front wheel braking operation unit, when the front wheel braking operation unit is operated in addition to the rear wheel braking operation unit, and the front wheel braking unit is generating braking force in combination with the rear wheel braking unit, wherein the arithmetic expression is represented by: $PA = PB + K \times PC1$, and wherein PA represents the target hydraulic pressure, PB represents hydraulic pressure of the front wheel braking unit, K represents a preset prescribed function, and PC1 represents a target additional hydraulic pressure based on the additional operation of the front wheel braking operation unit.

2. The brake device for a motorcycle according to claim 1, wherein the correction is carried out so as to give a rise in hydraulic pressure in line with a tendency of the brake hydraulic pressure of the front wheel braking unit generated in combination with the operation of the rear wheel braking operation unit to rise.

3. The brake device for motorcycle according to claim 1, wherein the target hydraulic pressure acting on the front wheel braking unit is decided by adding the hydraulic pressure of the front wheel braking unit acting in combination with the rear wheel braking unit and the target additional hydraulic pressure corrected using the prescribed function.

4. The brake device for a motorcycle according to claim 3, wherein the target additional hydraulic pressure is corrected using a correction coefficient set in advance by a relationship with a magnitude of hydraulic pressure for the front wheel braking unit.

5. The brake device for a motorcycle according to claim 3, wherein the prescribed function is a function that corrects the target additional hydraulic pressure using a prescribed rate of decreasing.

6. The brake device for a motorcycle according to claim 4, wherein the correction coefficient is a map set in advance and correlated to the magnitude of the hydraulic pressure of the front wheel braking unit.

7. A method, comprising:
electrically driving and controlling a front wheel braking unit and a rear wheel braking unit in response to each operation of a front wheel braking operation unit and a rear wheel braking operation unit;
driving and controlling the rear wheel braking unit and the front wheel braking unit in a combined manner based on an operation of the rear wheel braking operation unit;
correcting a target hydraulic pressure acting on the front wheel braking unit using an arithmetic expression in such a manner that a braking force of the front wheel braking unit becomes smaller than a braking force corresponding to an additional operation of the front wheel braking operation unit, when the front wheel braking operation unit is operated in addition to the rear wheel braking operation unit, and the front wheel braking unit is generating braking force in combination with the rear wheel braking unit, wherein the arithmetic expression is represented by: $PA=PB+K \times PC1$, and wherein PA represents the target hydraulic pressure, PB represents hydraulic pressure of the front wheel braking unit, K represents a preset prescribed function, and PC1 represents a target additional hydraulic pressure based on the additional operation of the front wheel braking operation unit.

8. The method according to claim 7, wherein the correcting comprises correcting the target hydraulic pressure so as to give a rise in hydraulic pressure in line with a tendency of the brake hydraulic pressure of the front wheel braking unit generated in combination with the operation of the rear wheel braking operation unit to rise.

9. The method according to claim 7, further comprising determining the target hydraulic pressure acting on the front wheel braking unit by adding the hydraulic pressure of the front wheel braking unit acting in combination with the rear wheel braking unit and the target additional hydraulic pressure corrected using the prescribed function.

10. The method according to claim 9, wherein the correcting comprises using a correction coefficient set in advance by a relationship with a magnitude of hydraulic pressure for the front wheel braking unit.

11. The method according to claim 9, wherein the prescribed function is a function that corrects the target additional hydraulic pressure using a prescribed rate of decreasing.

12. The method according to claim 10, wherein the correction coefficient is a map set in advance and correlated to the magnitude of the hydraulic pressure of the front wheel braking unit.

13. A brake device, comprising:
driving means for electrically driving and controlling a front wheel braking unit and a rear wheel braking unit in response to each operation of a front wheel braking operation unit and a rear wheel braking operation unit;
controlling means for driving and controlling the rear wheel braking unit and the front wheel braking unit in a combined manner based on an operation of the rear wheel braking operation unit;
correcting means for correcting a target hydraulic pressure acting on the front wheel braking unit using an arithmetic expression in such a manner that a braking force of the front wheel braking unit becomes smaller than a braking force corresponding to an additional operation of the front wheel braking operation unit, when the front wheel braking operation unit is operated in addition to the rear wheel braking operation unit, and the front wheel braking unit is generating braking force in combination with the rear wheel braking unit,
wherein the arithmetic expression is represented by: $PA=PB+K \times PC1$, and
wherein PA represents the target hydraulic pressure, PB represents hydraulic pressure of the front wheel braking unit, K represents a preset prescribed function, and PC1 represents a target additional hydraulic pressure based on the additional operation of the front wheel braking operation unit.

14. A brake device, comprising:
a driving unit configured to electrically drive and control a front wheel braking unit and a rear wheel braking unit in response to each operation of a front wheel braking operation unit and a rear wheel braking operation unit, and configured to drive and control the rear wheel braking unit and the front wheel braking unit in a combined manner based on an operation of the rear wheel braking operation unit;
a correcting unit configured to correct a target hydraulic pressure acting on the front wheel braking unit using an arithmetic expression in such a manner that a braking force of the front wheel braking unit becomes smaller than a braking force corresponding to an additional operation of the front wheel braking operation unit, when the front wheel braking operation unit is operated in addition to the rear wheel braking operation unit, and the front wheel braking unit is generating braking force in combination with the rear wheel braking unit,
wherein the arithmetic expression is represented by: $PA=PB+K \times PC1$, and
wherein PA represents the target hydraulic pressure, PB represents hydraulic pressure of the front wheel braking unit, K represents a preset prescribed function, and PC1 represents a target additional hydraulic pressure based on the additional operation of the front wheel braking operation unit.

15. The brake device according to claim 14, wherein the correcting unit is configured so as to give a rise in hydraulic pressure in line with a tendency of the brake hydraulic pressure of the front wheel braking unit generated in combination with the operation of the rear wheel braking operation unit to rise.

16. The brake device according to claim 14, wherein the target hydraulic pressure acting on the front wheel braking unit is decided by adding the hydraulic pressure of the front wheel braking unit acting in combination with the rear wheel braking unit and the target additional hydraulic pressure corrected using the prescribed function.

17. The brake device according to claim 16, wherein the correcting unit is configured to correct the target additional hydraulic pressure using a correction coefficient set in advance by a relationship with a magnitude of hydraulic pressure for the front wheel braking unit.

18. The brake device according to claim 16, wherein the prescribed function is a function that corrects the target additional hydraulic pressure using a prescribed rate of decreasing.

19. The brake device according to claim 17, wherein the correction coefficient is a map set in advance and correlated to the magnitude of the hydraulic pressure of the front wheel braking unit.

* * * * *